United States Patent [19]
Graham

[11] 3,920,259
[45] Nov. 18, 1975

[54] UTILITY CART
[76] Inventor: Mamon Daniel Graham, 1923 West Boulevard, Los Angeles, Calif. 90016
[22] Filed: Nov. 25, 1974
[21] Appl. No.: 526,765

[52] U.S. Cl. ............................ 280/47.34; 280/79.3
[51] Int. Cl.² ........................................... B62B 3/00
[58] Field of Search ............ 280/47.35, 47.37, 34 B, 280/79.3; 211/182

[56] References Cited
UNITED STATES PATENTS
| | | | |
|---|---|---|---|
| 2,840,384 | 6/1958 | Bard | 280/47.37 R |
| 2,882,032 | 4/1959 | Garner | 280/79.3 |
| 2,913,029 | 11/1959 | Paton | 211/182 |
| D189,291 | 11/1960 | Clarke | 280/47.35 X |

FOREIGN PATENTS OR APPLICATIONS
| | | | |
|---|---|---|---|
| 415,835 | 10/1945 | Italy | 280/34 B |

Primary Examiner—Robert R. Song

[57] ABSTRACT

A light weight, variable capacity utility cart comprising upper and lower frame members of telescoping or of modular construction joined at spaced points about their periphery, the lower frame member having supporting means disposed vertically below aligned openings in the upper frame member for supporting containers such as trash barrels or the like. The device is mounted on wheels affixed to the lower frame member for supporting the containers above the ground. A suitable pull handle is provided at one end of the cart and which can preferably be disconnected and reconnected at the opposite end of the cart or folded for storage when desired.

9 Claims, 6 Drawing Figures

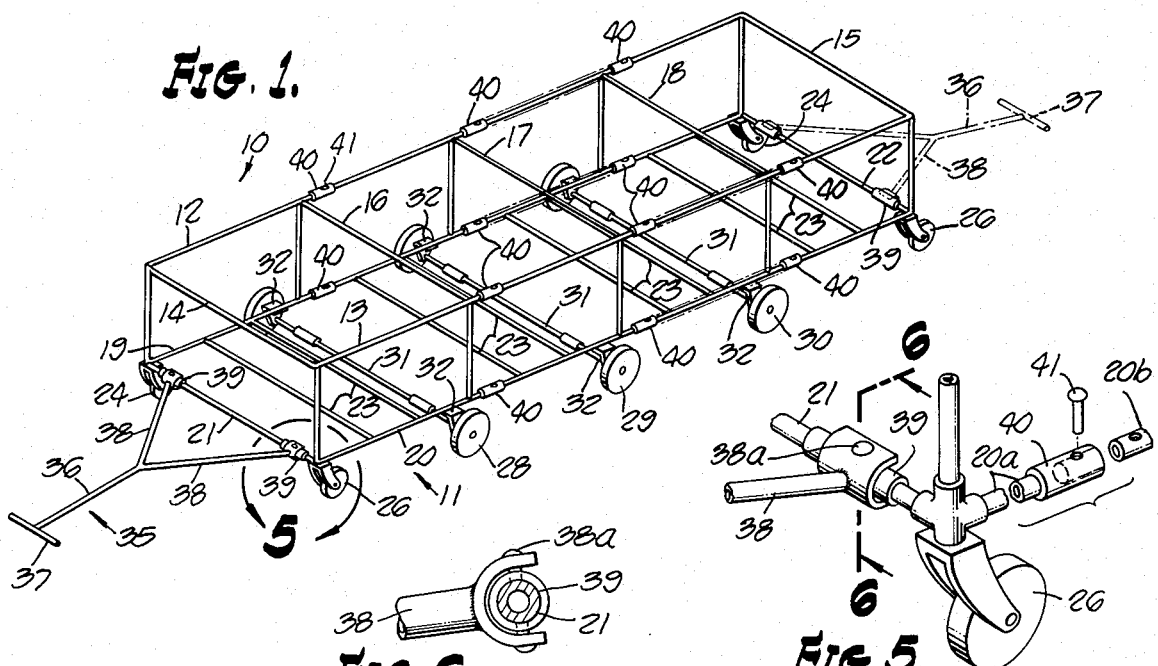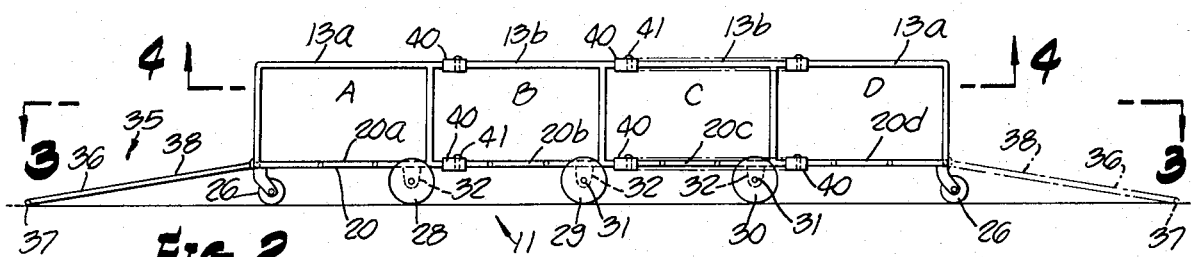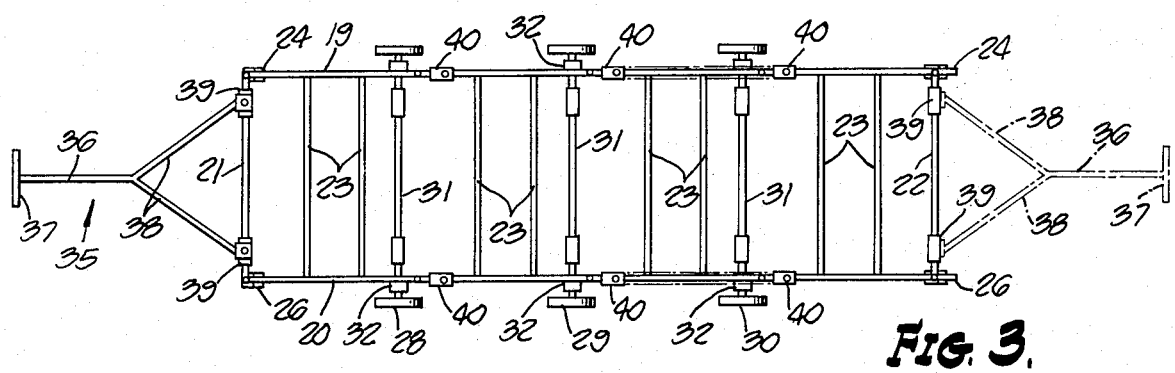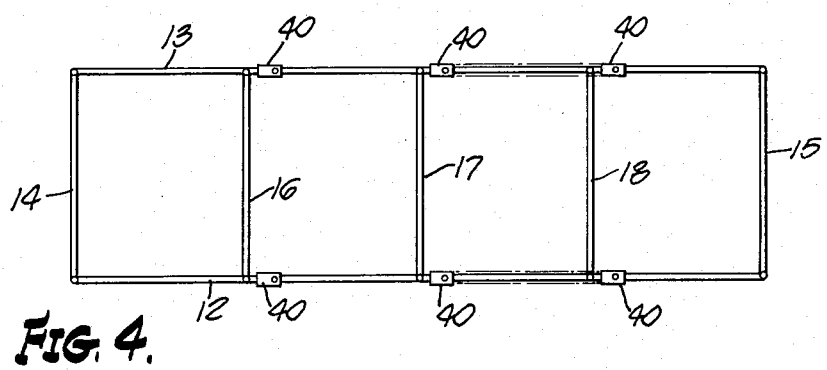

UTILITY CART

BACKGROUND OF THE INVENTION

The present invention relates to a wheel-supported utility cart of relatively simple and inexpensive construction and which is particularly suited for light commercial use as well as household use. The device has particular applicability to the transport of trash containers or garbage cans from one location to another. As is well known, trash cans ordinarily attract flies and/or rodents and frequently have a disagreeable odor. For this reason, trash containers are usually stored at a relatively inoffensive location removed from the usual activities of the home or business. The problem is particularly notable in supermarkets and food distribution establishments where trash containers, for reasons of health requirements and general esthetics, cannot be stored in locations frequented by the customers or likely to be observed therefrom. It therefore becomes necessary to move the trash cans, at least once a week or more often depending upon the frequency of local trash pick-up. The inconvenience of loading and unloading cans, one at a time, onto hand trucks or the like for transport from the storage location to the trash pick-up location indicates the necessity for a simple device which is capable of transporting a plurality of trash cans from one location to another and which will afford a means of storing the trash cans in a relatively neat, orderly fashion in order to prevent inadvertent tipping thereof and discharge of the usually offensive contents.

Preferably the capacity of the utility cart is easily varied to accommodate a selected number of containers. For example, if only three containers are to be handled, the device is easily adjusted such that the cart does not require substantially more space than three trash containers. If more containers are to be handled, the cart should be easily expanded.

It is accordingly an object of the present invention to provide a utility cart of general applicability which is easily constructed at relatively low cost, which is easily transported from location to location and which will conveniently store trash cans or other containers when the device is not used for transporting them from one location to another.

It is a further object of the invention to provide a utility cart which will support containers stored thereon at a location completely out of contact with the ground.

It is a further object of the invention to provide a utility cart for holding containers in a selected orientation and spacing with sufficient lateral support to prevent inadvertent tipping of individual containers by foraging animals or the like.

It is a further object of the invention to provide a utility cart which can be pulled by a single individual without mechanical assistance in order to transport a plurality of containers such as trash cans or the like from one location to another and which has a supporting handle preferably arranged for disconnection or folding to a compact position for storage.

It is a further object of the invention to provide a utility cart which can be easily adjusted to accommodate various size loads.

With the above objectives in mind, the present invention provides a utility cart constructed of superimposed upper and lower frames joined at spaced points about their periphery by vertical members. The spaced frames are sized and constructed to hold a plurality of trash containers in a row and support them at a location above the ground. A handle is provided for moving the utility cart from one location to another. The upper and lower frames are preferably of adjustable length and having a plurality of sub-sections.

BRIEF DESCRIPTION OF THE DRAWING

The features and advantages of the invention will become apparent from the following detailed description of the invention in light of the accompanying drawings in which:

FIG. 1 comprises a perspective view of the utility cart of the invention;

FIG. 2 comprises a side elevation of the utility cart of the present invention;

FIG. 3 comprises a plan view, partially in section, of the utility cart of the invention taken along lines 3—3 of FIG. 2;

FIG. 4 is a sectional view looking upwardly along lines 4—4 of FIG. 2;

FIG. 5 is a detail view taken at line 5—5 of FIG. 1 showing the wheel mounting and handle connection; and FIG. 6 is a cross-section at lines 6—6 of FIG. 5.

DESCRIPTION OF THE PREFERRED EMBODIMENT

FIG. 1 is a perspective view of the utility cart of the present invention which, as shown, is constructed of an upper frame generally designated by reference numeral 10 and and a lower frame generally designated by reference numeral 11. The upper frame 10 is comprised of two longitudinal side members 12, 13 connected at their ends by end members 14, 15. Intermediate cross braces 16, 17 and 18 are provided for structural rigidity and for separating the upper frame into four subsections A, B, C, D sized such that each will individually hold a respective container such as a trash can.

The lower frame 11 is constructed of longitudinally extending side members 19, 20 joined at their ends by cross braces 21 and 22. Intermediate cross braces 23 which also comprise supporting members for the containers are provided at locations below the apertures in the upper frame member 10 defined by the upper frame end members 14, 15 and the upper frame intermediate cross members 16, 17 and 18. As can be seen in FIG. 3, in the chosen embodiment, there are a total of eight, preferably removable, supporting members 23 in the lower frame 11. Two supporting members 23 are provided beneath each of the four sub-sections A–D defined by the upper frame.

The upper and lower longitudinal side members 12, 13, 19, 20 are preferably provided in sub-sections which can be added or removed whereby the length of the cart can be selectively adjusted to accommodate the desired number of containers as will be described below.

At the front and rear ends of the lower frame 11, wheels 24, 26 are provided. They are conveniently connected at the corners of the lower frame longitudinal members 19 and 20 with the respective lower frame end braces 21 and 22 so that the utility cart has support at the front and rear ends as shown in FIG. 5. These wheels 24, 26 are castered so that the device can be easily turned as desired.

Intermediate preferably castered, supporting wheels 28, 29, 30 are respectively journaled on axles 31 disposed at intermediate locations between the front and rear ends of the lower frame 11. As can be seen from FIG. 2, the axles 31 are disposed slightly below the lower frame 11 and connected thereto by suitable axle bearing supports 32 affixed to the longitudinal side members 19, 20 of the lower frame 11. It can thus be seen that the device is suitably supported both at the front and rear end and at intermediate locations therebetween. The intermediate wheels 28–30 are located outwardly of the lower frame 11 for lateral stability.

Pivotally connected to the front end of the lower frame 11 is a removable handle 35. The handle 35 is in turn constructed of a tongue 36 and cross piece 37 preferably provided with a suitable grip which can be used for transporting the utility cart from one location to another. The tongue 36 is joined a pair of draw members 38 which in turn are removably connected at suitable locations to connecting bearings 39 at the front of the utility cart as seen in FIGS. 5 and 6. Preferably, the draw pieces 38 are connected to the utility cart for pivotal movement about generally a horizontal axis defined by lower frame front end brace 21 so that the handle 35 can be pivoted to a vertical storage position if desired. Additional connecting bearings 39 are located on the axles 31 and rear lower frame end brace 22 so that handle 35 can be connected at either end of the cart. The handle connection comprises a bifurcated end on the draw members 38 for attachment with removable pins 38a to the cart bearings 39.

The pull cart is conveniently constructed from tubular stock such as plastic or metal pipe and suitable conventional pipe fittings. Plastic pipe has proven acceptable for most applications which do not require particularly high strength and plastic has the added advantages of being more economical and rust-free. The caster mounting of the front and rear wheels 24, 26 affords a greater degree of maneuverability to the utility cart than would otherwise be the case with wheels mounted on fixed axes transverse to the longitudinal dimension of the utility cart. The intermediate supporting wheels 28, 30 can also be mounted on casters if desired for additional maneuverability but this is not essential and such a construction requires greater lateral clearance for permitting castered intermediate wheels to swivel clear of the sides of the cart.

A highly preferred feature of the invention is obtained by constructing the cart for length adjustment to enable it to accommodate a variable number of containers as desired.

Alternative modes of constructing the cart for length adjustment are contemplated. The first and presently preferred mode of adjustment comprises the construction of the end section D of the cart to be telescopically received in the intermediate section c. Telescoping of one cart section into an adjacent cart section is facilitated by constructing the end portions 12a, 13a of the longitudinal upper frame side members 12, 13 of tubular stock having an external diameter slightly less than the internal diameter of adjacent intermediate portions 12b and 13b on the longitudinal upper frame side members 12, 13 as shown in dotted lines in FIGS. 2–4. Similarly, the end portions 19a, 20a of the lower frame longitudinal side members 19, 20a are of slightly smaller diameter than intermediate portions 19b, 20b of the lower frame longitudinal side members 19, 20. The cross braces 23 may be easily connected to the lower frame side members 19, 20 by means of bifurcated ends and removable pins, not shown, of the type used for connection of the handle to the cart. Thus, after removal of the lower frame cross braces 23 in the rear cart section D, the rear sections of the cart can be telescoped into the intermediate cart section C if desired to shorten the cart. Suitable retaining means such as retaining pins 41, will of course be provided to retain the cart sections in their proper relative positions.

Alternatively, adjustment of the cart length can be accomplished by interposing adjustment sleeves 40 in each of the longitudinal upper frame side members 12, 13 and in each of the longitudinal lower frame side members 19, 20 which are in turn constructed in sections of the same size. Sleeves 40 are thus located closely behind the intermediate wheel axle bearing supports 32 so that a two or three container cart could be provided by removing that section or sections of the cart between the longitudinally spaced sleeves 40 and directly connecting the disconnected front and rear sections of the cart together by insertion of front and rear sections of the side members 12, 13, 19, 20 into the sleeves 40. The sleeves 40 and mating ends of the side members 12, 13, 19, 20 are preferably apertured for insertion of removable retainer pins 41. Adjustability of length enables compact storage of both cart and and containers supported thereon in substantially the same amount of space as would be required for the containers alone.

The device of the present invention maintains the containers transported thereby at a location disposed above the ground whereby metal containers are less subject to groundrot or invasion by insects or rodents.

While the foregoing comprises a complete description of the presently preferred embodiment, persons skilled in the art will appreciate that departures can be made from the preferred embodiment which departures nevertheless will fall within the definition of the invention as set forth in the appended claims.

I claim:

1. A utility cart comprising a lower frame, an upper frame superimposed above and spaced from the lower frame and connected thereto by plurality of spaced connecting members, said frames each being constructed of a plurality of interconnectable sections, said upper frame having a plurality of spaced openings therein sized for holding individual containers to be transported from one location to another, the lower frame having elongated support members disposed beneath said openings, a plurality of support wheels connected to and disposed beneath said lower frame supporting said frames above the ground, and a transport handle connected to one of said frames, each said section of said cart comprising:
   a. a separate and integral rigid unit which includes members forming a part of said upper frame;
   b. members forming a part of said lower frame including some said support members;
   c. connecting members rigidly connecting said members forming a part of said upper frame to said members forming a part of said lower frame; and
   d. some said support wheels.

2. The utility cart of claim 1 wherein said upper and lower frame members are telescopically adjustable in length to provide a selected number of container openings on said cart.

3. The utility cart of claim 1 wherein said handle is connected to said lower frame member for pivotal movement about a generally horizontal axis.

4. The utility cart of claim 3 wherein said handle is disconnectable from said lower frame member when desired.

5. The utility cart of claim 1 wherein said lower frame is spaced from said upper frame a vertical distance suitable for retaining containers supported on said cart from tipping.

6. The utility cart of claim 1 wherein said wheels are castered.

7. A lightweight variable - capacity utility cart comprising superimposed upper and lower generally planar frames interconnected supported on wheels, said frames each having a pair of longitudinal side members and transverse members at the ends thereof, the lower frame having a plurality of elongated cargo supports in the plane of the lower frame, the upper frame having a plurality of transverse cross braces spaced longitudinally at selected distances depending on the cargo to be transported, and each of said frames being constructed of a plurality of wheel-supported sub-sections rigidly connected together by fasteners in the longitudinal side members for providing a cart of selected length and capacity depending on the number of assembled sub-sections, each of said sub-sections comprising a separate and integral unit which includes:
 a. members forming a part of said upper frame;
 b. members forming a part of said lower frame including some said cargo supports;
 c. connecting members rigidly connecting said members forming a part of said upper frame of said members forming a part of said lower frame; and
 d. some said support wheels.

8. The utility cart of claim 7 including a transport handle connected thereto and pivotable about a generally horizontal axis extending transversely of the cart near one end thereof.

9. The utility cart of claim 8 wherein each sub-section of the cart has means thereon for attachment of said handle whereby said handle can be attached at either end of the cart.

* * * * *